UNITED STATES PATENT OFFICE.

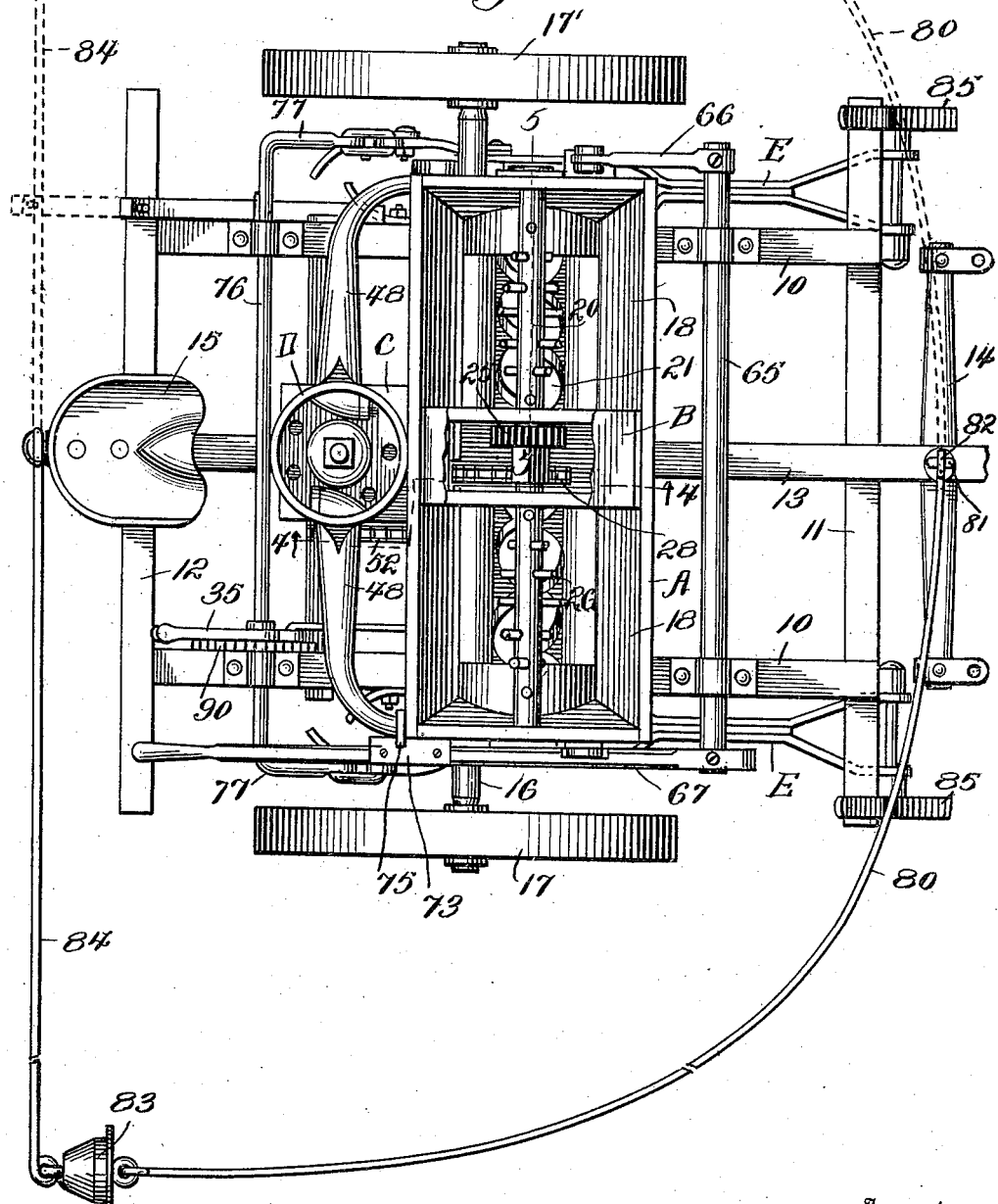

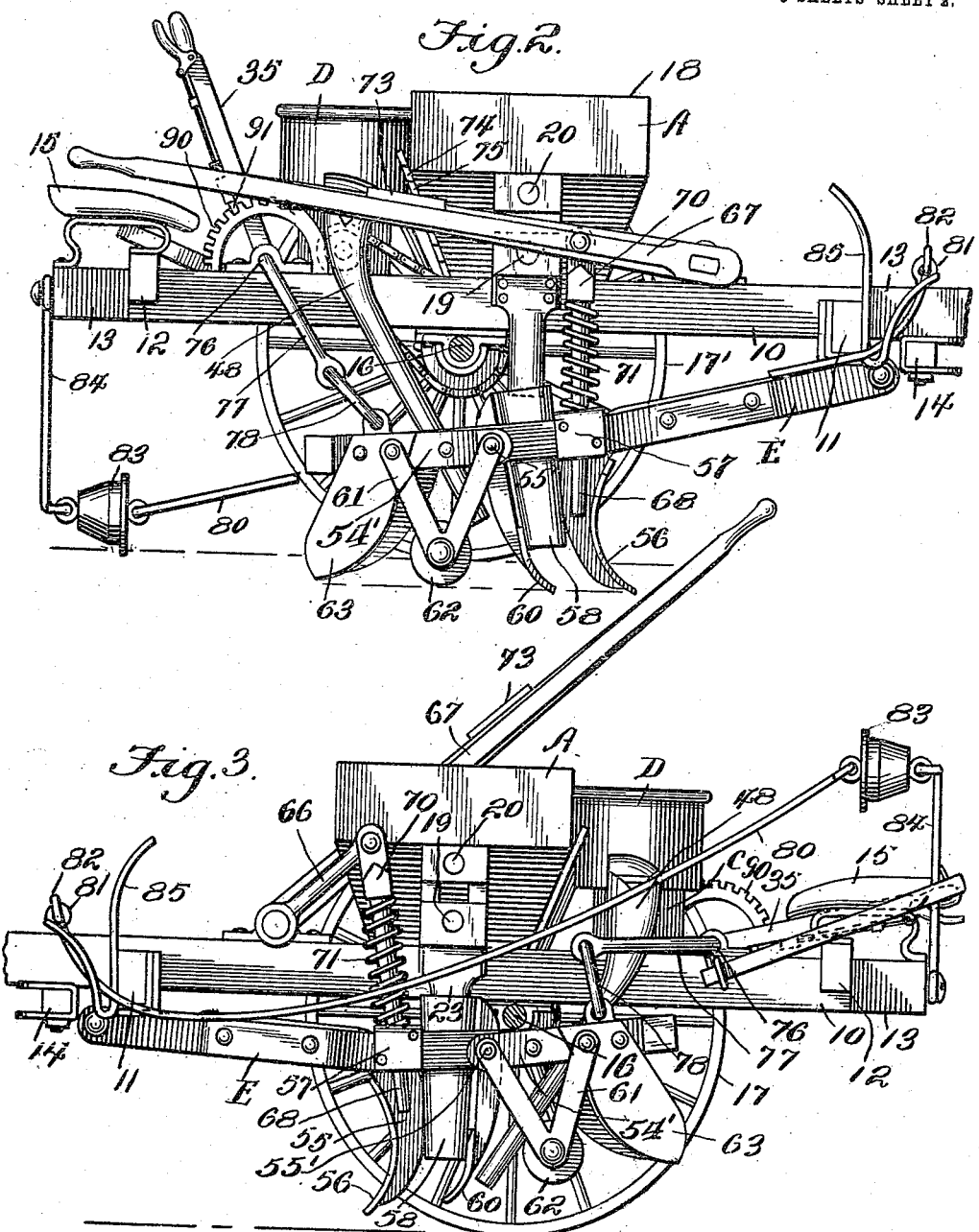

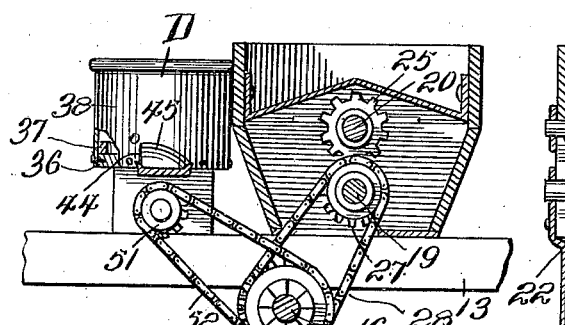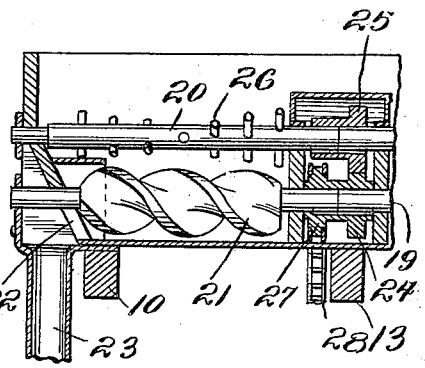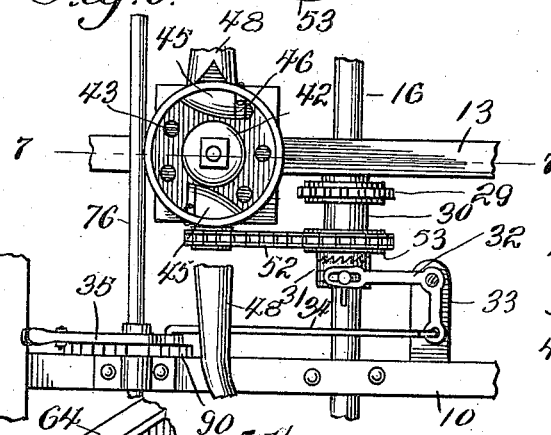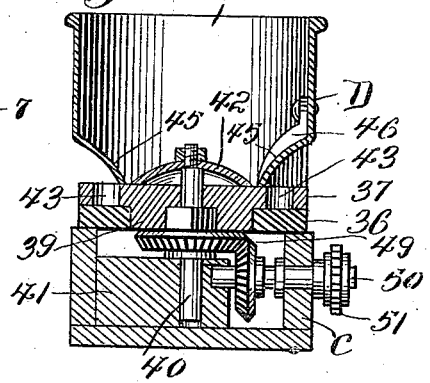

WASHINGTON B. MYERS, OF NEW OXFORD, PENNSYLVANIA.

CORN-PLANTER AND FERTILIZER-DISTRIBUTER.

987,482.      Specification of Letters Patent.   Patented Mar. 21, 1911.

Application filed September 8, 1909. Serial No. 516,664.

*To all whom it may concern:*

Be it known that I, WASHINGTON B. MYERS, a citizen of the United States, residing at New Oxford, in the county of Adams and State of Pennsylvania, have invented new and useful Improvements in Corn-Planters and Fertilizer - Distributers, of which the following is a specification.

This invention relates to seeders and planters and it has for its object to produce a machine of simple and improved construction whereby seed corn and fertilizing material may be simultaneously deposited in the ground.

Further objects of the invention are to simplify and improve the general construction and operation, and to produce a machine of the class described which shall possess superior advantages in point of simplicity, durability and general efficiency.

With these and other ends in view which will readily appear as the nature of the invention is better understood the same consists in the improved construction and novel arrangement and combination of parts which will be hereinafter fully described and particularly pointed out in the claim.

In the accompanying drawings has been illustrated a simple and preferred form of the invention; it being however understood that no limitation is necessarily made to the precise structural details therein exhibited, but that changes, alterations and modifications within the scope of the invention may be resorted to when desired.

In the drawings: Figure 1 is a top plan view of a machine constructed in accordance with the invention. Fig. 2 is a side elevation of the same, the near wheel having been removed, and the furrow opening and covering devices being shown in earth engaging position. Fig. 3 is a side elevation of the machine as seen from the opposite side with the near wheel removed, and with the furrow opening and covering devices in a raised position. Fig. 4 is a vertical sectional detail view taken on the plane indicated by the line 4—4 in Fig. 1. Fig. 5 is a vertical sectional detail view taken longitudinally through the fertilizer box or hopper taken on the line 5—5 in Fig. 6. Fig. 6 is a detail plan view of a portion of the frame, showing the seed box and showing also a portion of the axle and operating mechanism. Fig. 7 is a vertical sectional view taken transversely through the seed box and related parts taken on the line 7—7 in Fig. 6. Fig. 8 is a perspective detail view showing one of the beams carrying the furrow opening and covering devices and the spouts or chutes whereby fertilizing material is conducted to the ground.

Corresponding parts in the several figures are denoted by like characters of reference.

The improved machine comprises in its construction a rectangular frame composed of the side members 10—10 and the front and rear members which are designated respectively by 11 and 12. The frame also includes a center bar 13 disposed intermediate the side beams; this center bar is extended forwardly of the front member of the frame for the attachment of draft means such as an equalizer 14; the center bar also extends rearwardly of the rear member of the frame to support a seat 15 for the rider or operator. The frame is supported upon an axle 16 which is revoluble in its bearings and which is equipped with transporting wheels 17 and 17′ the former of which is fixed upon the axle for rotation therewith in order that motion may be transmitted from said axle to the movable parts of the mechanism.

A box or hopper A which is supported transversely upon the casing above and slightly in front of the axle is divided by an intermediate casing B into two end compartments 18. The end walls of the hopper A and the side walls of the casing B afford bearings for a conveyer shaft 19 and for a superposed agitator shaft 20. The shaft 19 is equipped within the compartments 18 with spiral flanges 21 forming right and left hand conveyers or augers whereby fertilizing material, when the shaft is rotated in the proper direction will be conveyed toward the outer ends of the compartments where apertures 22 are formed through which the fertilizing material may escape into chutes or spouts 23 disposed adjacent to said apertures. The conveyer shaft is equipped within the casing B with a pinion 24 meshing with a pinion 25 upon the agitator shaft which latter is equipped within the compartments 18 with radial fingers 26 forming agitators whereby the contents of the compartments is stirred and kept in a loose condition to enable it to be conveniently and efficiently fed in the direction of the discharge openings. The shaft 19 carries a sprocket wheel 27 which is connected by a chain 28 with a sprocket wheel 29 from which it receives motion; said sprocket wheel being mounted upon a sleeve 30 supported upon the axle of the machine, and constituting one member of a clutch the other member of which 31 is slidable upon and revoluble with the axle so as to transmit motion when it is in locking engagement with the sleeve or clutch member 30. The clutch member 31 is actuated to throw it into or out of engagement with the clutch member 30 by means of a shipping lever consisting of a bell crank 32 supported upon a bracket 33 that extends from one side member of the frame, one arm of said bell crank being connected by a link 34 with a hand lever 35 whereby it may be conveniently and efficiently operated. This hand lever has an additional function which will be hereinafter referred to.

A shallow casing C which is suitably supported upon the longitudinal center bar of the frame supports a cylindrical seed box or hopper D having an annular bottom member 36 upon which the seed disk 37 is supported for rotation; the side walls 38 of the hopper being connected with the bottom member 36 as will be best seen in Fig. 4 of the drawings. The seed disk 37 has a downwardly extending boss 39 engaging the annular bottom member 36. A vertical shaft 40 which is centrally disposed with reference to the cylindrical hopper has a bearing in a box or block 41 within the casing C where it is supported for rotation, said shaft being extended through the seed disk 37 which is connected for rotation therewith and above which said shaft carries a convex disk 42 for the purpose of shedding the seed contained in the hopper in the direction of the side walls of the casing so that the seed will readily enter into the seed cups or apertures 43 with which the seed disk is provided. The side walls of the seed box are provided at diametrically opposite sides with slots 44 forming tongues 45 which are inwardly offset adjacent to the upper face of the seed disk; cut-offs 46 are disposed adjacent to the opened ends of the tongues of offsets, said cut-offs serving to wipe off any surplus of seeds entering into the seed cups, the contents of which are discharged into the chutes or spouts 48 that are supported adjacent to the openings in the side walls of the seed box, and which are so curved and inclined that seed discharged therein will readily be conveyed, by gravity, to the ground in rear of the furrow openers which are disposed at the sides of the frame as will be presently described. The vertical seeder shaft 40 is connected by bevel gearing 49 with a shaft 50 supported in one of the side walls of the casing C and having an additional bearing in the block 41; said shaft 50 carries a sprocket wheel 51 that is connected by a chain 52 with the sprocket wheel 53 upon the sleeve or clutch member 30, the operation of which has already been described, and which serves to convey motion to the seed dropping mechanism.

Hingedly supported upon the front member 11 of the frame of the machine and extending rearwardly adjacent to the side members 10—10 of said frame are the beams E each of which, as will be best seen by reference to Fig. 8 of the drawings, is composed of two suitably connected side members 54, including between them, adjacent to their front ends, the standards 55 carrying the furrow openers 56. The side members 54 are connected and spaced above the furrow opener by a plate 57 in rear of which is disposed a conducting tube 58 the upper end of which receives the lower end of the fertilizer spout 23 at the side of the machine. In rear of and adjacent to the tube 58 is arranged a standard 59 carrying a mixing plow 60 in rear of which the seed is discharged from the lower end of the seed chute 48 which is directed in rear of said mixing plow. Extension members 54′ are pivotally connected with the side members 54 by means of a bolt 55′; said side members 54 being provided adjacent to their rear ends with vertical slots 56′ for the passage of a fastening member 57′, whereby the extension members 54′ may be adjustably secured with relation to the side members 54 of the beam. V-shaped brackets 61 carrying a packing roller 62 are secured to the extension members 54′ in rear of the seed spout by means including the pivot member 55′, and covering blades 63 are mounted upon the extension members 54′ adjacent to the rear ends of the latter. It will be seen that by adjusting the extension members 54′ with reference to the side members 54, vertical adjustment of the packing roller 62 may be effected. The various members included between the side members of the beams may be mounted or secured in such a manner as to facilitate vertical adjustment or other such adjustment as may be desired.

The beams E at the two sides of the machine are connected adjacent to their rear ends by a cross bar 64 which affords a foot piece upon which the driver or operator may exert the pressure of his feet in a downward direction for the purpose of causing the furrow openers and allied parts to engage the ground with the desired amount of pressure.

A rock shaft 65 which is supported for oscillation upon the frame a short distance in advance of the fertilizer proper is provided with radial arms 66 and 67 the latter of which is extended to form a hand lever within convenient reach of the operator. The arms 66 and 67 are provided with pivotally supported rods 68 that extend downwardly through apertures 69 in the plates 57 upon the beams E. The rods 68 are formed with shoulders 70, and springs 71 are coiled upon said rods intermediate the shoulders 70 and the plates 57 to exert pressure in a downward direction upon the beams. This pressure may be regulated by means of the lever extension of the arm 67 which is equipped with a tooth 73 adapted to engage any one of a plurality of notches 74 in a ratchet bar 75 that is suitably mounted upon the fertilizer box or in some other suitable and convenient position.

The hand lever 35 to which reference has hereinbefore been made is mounted upon and extends radially from the rock shaft 76 which is supported for oscillation upon the frame of the machine adjacent to the rear end of the latter; said rock shaft being provided with terminal cranks 77 that are connected with the beams E by means of links 78; it will be seen that by manipulating the lever in one direction the beams carrying the furrow openers and the coverers will be moved downwardly to an earth engaging position, and by the same movement of the lever the clutch member 31 will be moved into locking engagement with the sleeve or clutch member 30, thus placing the movable parts of the mechanism in condition for receiving motion from the axle; by the reverse movement of the hand lever 35, the rear ends of the beams will be elevated to a non-engaging position, and the clutch members will be thrown out of gear, thus disconnecting the movable parts of the mechanism from the source of power.

The center bar 13 of the frame is provided adjacent to its front and rear ends with means for supporting a marker, the latter comprising a front member 80 having at its front end an eye 81 whereby it is connected with the eye bolt 82, the rear end of said front member being loosely connected with the marker disk 83; the rear member 84 of the marker is pivoted upon the rear end of the frame bar 13, and the other end of said member 84 is loosely connected with the rear side of the marker disk 83. Brackets 85 are provided upon either side of the frame of the machine for the purpose of supporting the marking device in position for operation, and said marking device may be readily transferred from one side of the machine to the other as will be well understood by those familiar with this class of devices.

A segment rack 90 is provided, the same being adapted to be engaged by a stop member 91 suitably connected with the hand lever 35 for the purpose of securing the said lever and the parts controlled thereby in any of the various positions to which they may be adjusted.

From the foregoing description taken in connection with the drawings hereto annexed the operation and advantages of this invention will be readily understood by those skilled in the art to which it appertains.

It will be noticed that the fertilizing material will be dropped in the furrow formed by the furrow opener 56, directly in rear of the latter, and that the mixing plow 60 following in rear of the spout 58 will serve to stir the fertilizing material in the bottom of the furrow and to intermix it with the soil in advance of the chute or spout whereby the seed is deposited. I thereby avoid placing the seed directly upon the fertilizing material, which might prove injurious; on the contrary, the bottom of the furrow is loosened and stirred and at the same time intermixed with the fertilizing material to provide a loose and yielding bed for the seed whereby the germination and sprouting of the seed will be facilitated, and rapid and vigorous growth promoted. The soil is compacted upon the seed by the roller 62 which travels in the furrow but does not necessarily touch the bottom thereof; the actual covering operation being performed by the blades 63.

The machine may be readily thrown into and out of gear as may be desired; and the depth of the furrow may be regulated by downward pressure upon the beams E by the means provided for that purpose.

Having thus described the invention, what is claimed is—

In a machine of the character described, a wheel carrying axle, a main frame supported thereon, beams hingedly connected with the front end of the frame, each of said beams including side members spaced apart by an intermediate member carrying a furrow opener and extension members hingedly and adjustably connected with the rear ends of the side members, a standard carrying a mixing plow supported between the side members, V-shaped brackets carrying a packing roller, said brackets being connected with the extension members of the side beams by means including the pivot members supporting said extension members, covering blades connected with the extension members, and a fertilizer duct supported between the side members intermediate the furrow opener and the mixing plow; and means carried by the frame for discharging fertilizing material into the duct and for depositing seed intermediate the mixing plow and the packing roller.

In testimony whereof I affix my signature in presence of two witnesses.

WASHINGTON B. MYERS.

Witnesses:
GEO. F. RABINE,
C. L. EICHALTZ.

Copies of this patent may be obtained for five cents each, by addressing the "Commissioner of Patents, Washington, D. C."